Aug. 27, 1929.  R. SINKES  1,725,834
EXHAUST ELIMINATOR
Filed Feb. 9, 1928    2 Sheets-Sheet 1
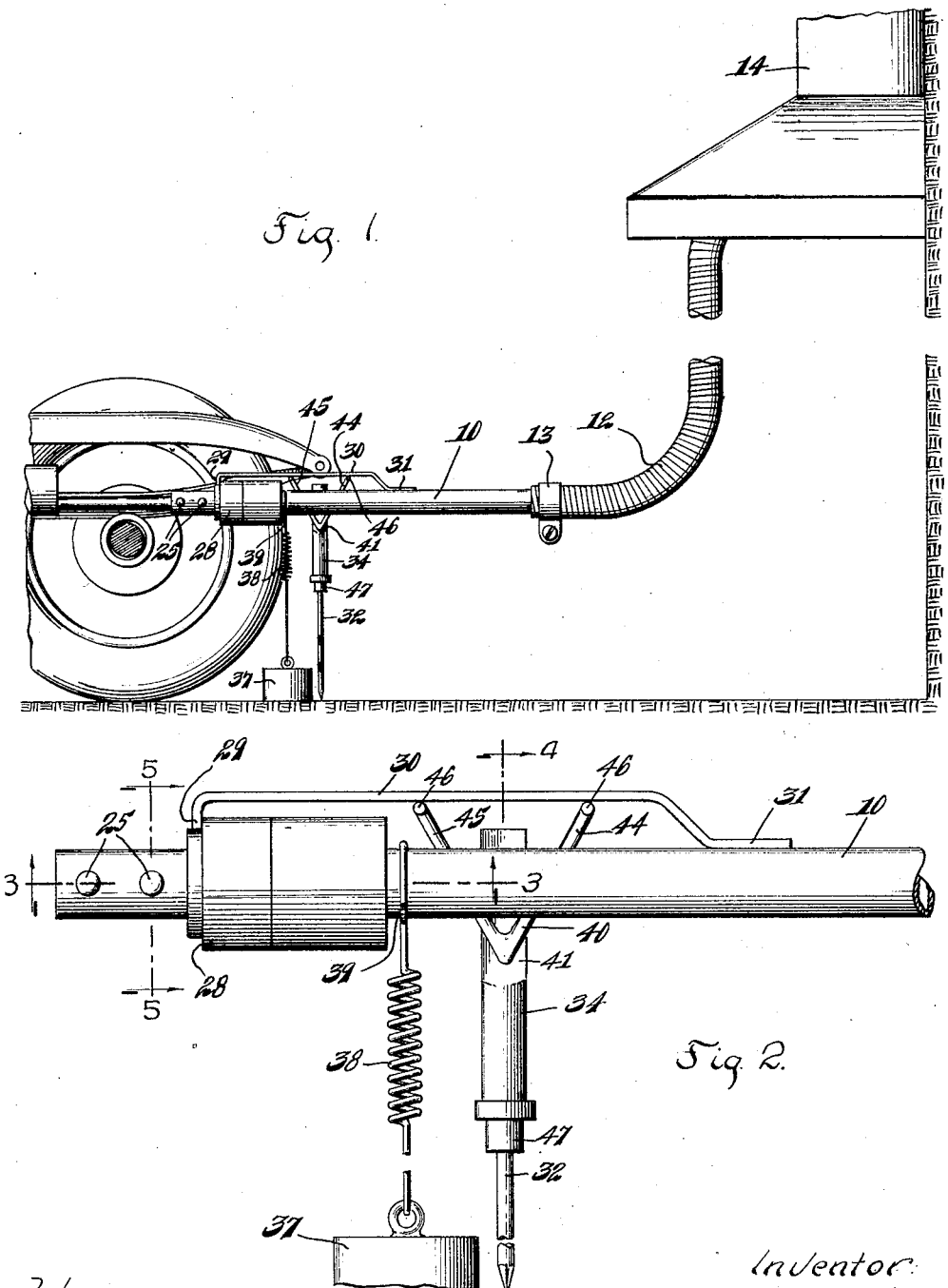

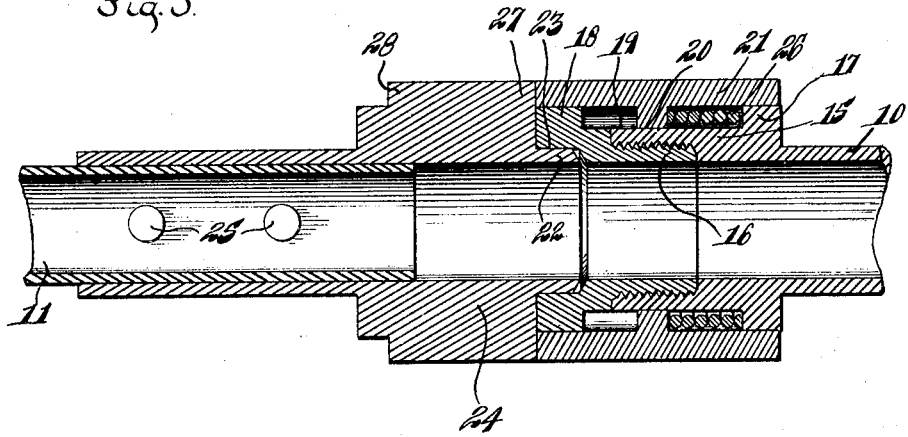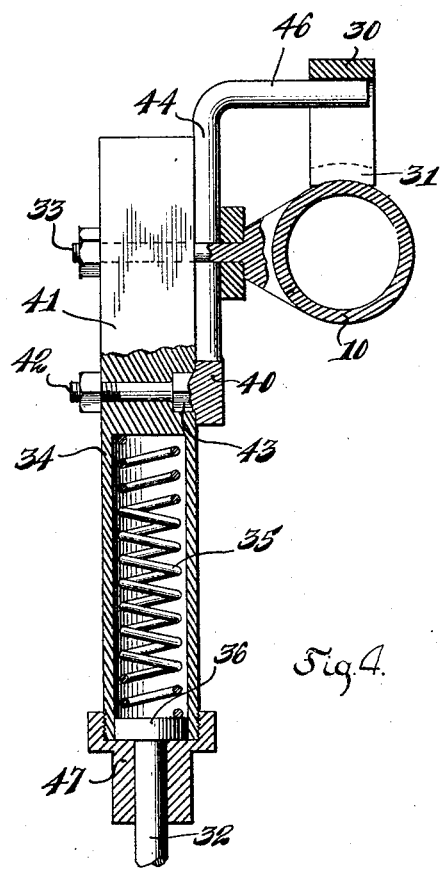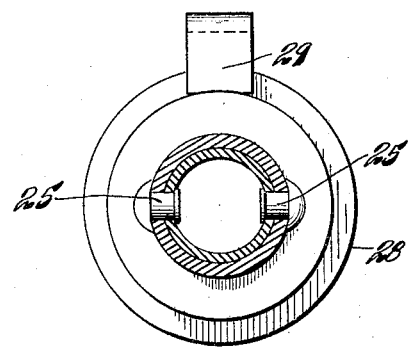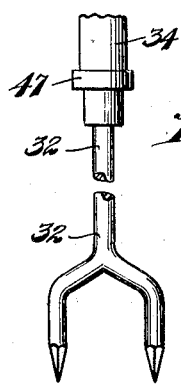

Patented Aug. 27, 1929.

1,725,834

UNITED STATES PATENT OFFICE.

ROSCOE SINKES, OF CEDAR LAKE, INDIANA.

EXHAUST ELIMINATOR.

Application filed February 9, 1928. Serial No. 253,201.

My present invention relates to an automobile attachment and more particularly to an attachment in the form of an exhaust eliminator for the purpose of preventing the accumulation of burnt gases in garages when the automobile engine is running.

The main object of my invention is to provide an exhaust eliminator which is readily attached to the exhaust pipe of an automobile and having means for leading gases therefrom to a stack or other exit and comprises means for automatically releasing the device whenever the automobile is moved forwardly or backwardly.

My invention will be best understood by reference to the accompanying drawings forming a part of this specification, in which:

Figure 1 is an elevational view of my invention showing it attached to the exhaust pipe of an automobile as in operation.

Figure 2 is an enlarged view of my invention disclosed in Figure 1.

Figure 3 is a longitudinal, sectional view taken on line 3—3 of Figure 2.

Figure 4 is a sectional view taken on substantially the line 4—4 of Figure 2.

Figure 5 is a cross sectional view taken on the line 5—5 of Figure 2.

Figure 6 is a rear elevational view of the supporting fork employed in my invention.

For the purpose of illustration, I have disclosed in the drawings a preferred form of my invention which comprises a tubular member 10 in alignment with the exhaust pipe 11 of an automobile and having a flexible conduit 12 secured to the rearward end thereof by means of a clamp 13 and the flexible conduit 12 leads to a stack 14 or other suitable gas exit. The tubular member 10 is provided with an enlarged cylindrical portion 15 which is threaded on the inner side of the forward end thereof for receiving a threaded bushing 16 and having threaded engagement therewith. The cylindrical portion 15 has a flange 17 thereon, and a similar flange 18 is provided on the forward end of the bushing 16 thereby forming a channel 19 therebetween in which the annular ring 20 extends when the sleeve 21 is positioned on the flanges 17 and 18 as shown in Figure 3.

The bushing 16 is provided with an enlarged opening 23 in the forward end which is adapted to receive the extension 22 of the hollow cylindrical member 24 which is secured to the exhaust pipe 11 by means of suitable rivets 25 as shown in Figure 5.

A coil spring 26 is positioned between the flange 17 and the inwardly extending flange 20 for the purpose of urging the sleeve 21 in a forwardly direction and into contact with the shoulder 27 on the member 24 for making a substantially air tight contact therewith. A forward shoulder 28 is provided on the member 24 and is adapted to engage the end portion 29 of the spring member 30 which is secured to the tubular member 10 at 31 in any suitable manner.

It will be noted that by the cooperation of the extention 22 and the spring 30, the tubular member 10 is releasably maintained in alignment with the exhaust pipe 11, and in order that the same may become detached when the car is moved in either direction, I have provided a supporting fork 32 which engages the ground or floor as the case may be, and is pivotally secured to the member 10 by means of a bolt 33 which is integral with the member 10 and passes through the upper end or shank of the vertically positioned cylinder 34. The lower end of said cylinder is hollow and has a coil spring 35 therein which engages the head 36 of the fork 32 for yieldingly forcing the fork downwardly and the cylinder upwardly for supporting the tube 10 as shown in Figure 1. In order to maintain the required amount of friction between the fork and the floor, a weight 37 is provided which is equipped with a coil spring 38 having a loop 39 at the upper end through which the tube 10 is fitted. A V-shaped member 40 is rigidly secured to the shank 41 of the cylinder 34 by means of a bolt 42 which is integral therewith and is provided with a squared portion 43 thereon engaging into a similar square opening in the shank so that the arms 44 and 45 are maintained in the same relative position with the cylinder 34. The upper ends of the arms 44 and 45 are bent sideways as at 46, and engage under the spring 30 and substantially in contact with the spring 30 when the cylinder 34 is in a vertical position which is the position maintained by said cylinder when the exhaust eliminator is in use. It will be apparent that when the automobile moves either forwardly or backwardly the lower end of the fork 32 retains its position on the floor and since the fork 32 is held rigid laterally by means of the cap 47, as shown in Figure 4, it causes the cylinder 34 to rotate on the bolt 33 and thereby causing one of the arms 44 or 45 to lift on the spring 30 and disengage the end 29 from the shoulder 28 which automatically releases the member 10 so that the spring 26 through the medium of the sleeve 21 forces the extention 22 from engagement in the opening 23 and the automobile may continue to move without damage to the exhaust eliminator which remains standing in the same position after being released from the automobile.

Having described my invention in its preferred form, it will be apparent to those skilled in the art that it is capable of certain modifications without departing from the spirit of the invention and I do not wish to be limited to the exact details herein illustrated and described but desire to avail myself of such variations and modifications as come within the scope of the appended claims.

I claim as my invention:

1. A device of the class described comprising a tubular member having means secured thereto for leading gases therefrom to an exit; an enlarged cylindrical portion on said tubular member; means for releasably securing said enlarged portion in alignment with the exhaust pipe of an automobile; means for automatically releasing said securing means upon the movement of the automobile.

2. A device of the class described comprising a tubular member having means secured thereto for leading gases therefrom to an exit; a hollow cylindrical member on the exhaust pipe of an automobile; an enlarged cylindrical portion on said tubular member; means for securing said cylindrical member and said cylindrical portion in alignment; means for automatically releasing said securing means upon the movement of the automobile.

3. An exhaust eliminator comprising a tubular member; a flexible conduit secured to said tubular member for leading gases from said member to an exit; an enlarged cylindrical portion on said tubular member; a bushing having threaded engagement with the inner side of said cylindrical portion; a flange on said portion and a flange on said bushing forming a channel therebetween; a sleeve seated on said flanges; said sleeve having an annular flange extending into said channel; a spring interposed between said inwardly extending flange and the flange on said cylindrical portion yieldingly urging said sleeve forwardly; a hollow cylindrical member on the exhaust pipe of an automobile; an extension on said member engaging within said bushing; a shoulder on the rear end of said cylindrical member; said sleeve and said bushing engaging the rear end of said shoulder; means for releasably securing said member and said cylindrical portion in alignment; means for automatically releasing said securing means upon the movement of the automobile.

4. An exhaust eliminator comprising a tubular member; means for leading gases from said member to an exit; means for securing said member in alignment with an exhaust pipe of an automobile; means for automatically releasing said securing means upon the movement of the automobile; said releasing means comprising a fork having engagement with the floor and being pivoted to said tubular member through the medium of a vertically positioned cylinder; a V-shaped member rigidly secured with respect to said fork and having arms thereon for engaging and releasing said securing means upon the movement of the automobile.

5. An exhaust eliminator comprising a tubular member; means for leading gases from said tubular member to an exit; a hollow cylindrical member secured to the exhaust pipe of an automobile; means for releasably securing said tubular member in alignment with said cylindrical member; means for automatically releasing said securing means upon the movement of the automobile; said securing means comprising a spring member secured to the tubular member and engaging the forward side of a shoulder on the cylindrical member; said releasing means comprising a vertically positioned cylinder having a fork for oscillating the same and means rigidly secured to the shank of said cylinder for lifting said spring out of engagement with said shoulder when said cylinder is oscillated.

6. A device of the class described comprising a tubular member having means secured thereto for leading gases therefrom to an exit; an enlarged cylindrical portion on said tubular member; means for releasably securing said enlarged portion in alignment with the exhaust pipe of an automobile; means for automatically releasing said securing means upon the movement of the automobile; said releasing means comprising a V-shaped member secured for oscillation with respect to said tubular member; means for oscillating said V-shaped member; portions on the arms of the V-shaped member engaging said securing means for releasing said securing means when said V-shaped member is oscillated.

7. A device of the class described comprising a tubular member having means secured thereto for leading gases therefrom to an exit; a hollow cylindrical member on the exhaust pipe of an automobile; an enlarged cylindrical portion on said tubular member; means for securing said cylindrical member and said cylindrical portion in alignment; means for automatically releasing said securing means upon the movement of the automobile; said securing means comprising an extension on said cylindrical means and a spring member secured to the tubular member and engaging a shoulder on said cylindrical member; oscillatory means secured to said tubular member having a fork engaging the floor and a V-shaped member thereon; arms on said V-shaped member engaging the lower side of said spring for lifting said spring out of engagement with said shoulder when said oscillatory means is oscillated.

8. An exhaust eliminator comprising a tubular member; a flexible conduit secured to said tubular member for leading gases from said member to an exit; an enlarged cylindrical portion on said tubular member; a bushing having threaded engagement with the inner side of said cylindrical portion; a flange on said portion and a flange on said bushing forming a channel therebetween; a sleeve seated on said flanges; said sleeve having an annular flange extending into said channel; a spring interposed between said inwardly extending flange and the flange on said cylindrical portion yieldingly urging said sleeve forwardly; a hollow cylindrical member on the exhaust pipe of an automobile; an extension on said member engaging within said bushing; a shoulder on the rear end of said cylindrical member; said sleeve and said bushing engaging the rear end of said shoulder; means for releasably securing said member and said cylindrical portion in alignment; means for automatically releasing said securing means upon the movement of the automobile; the securing means comprising a horizontally extending spring member secured to the tubular member and engaging a shoulder on said cylindrical member; said releasing means comprising an oscillatory member secured for movement relative to said tubular member; said oscillatory member comprising a cylinder having a shank thereon; a fork secured to the lower portion of said cylinder for yieldingly engaging the floor; a V-shaped member rigidly secured to said shank; arms on said V-shaped member having portions thereof engaging under said spring for lifting said spring when said shank is oscillated; means for increasing the friction of said fork with said floor.

9. An exhaust eliminator comprising a tubular member; means for leading gases from said tubular member to an exit; means for releasably securing said tubular member in alignment with an exhaust pipe of an automobile; and means including a supporting strut pivotally attached at its upper portion to said tubular member and resting pivotally at its lower end on the floor for automatically releasing said securing means upon the movement of the automobile either forwardly or rearwardly.

10. An exhaust eliminator comprising a tubular member; means for leading gases from said tubular member to an exit; a hollow cylindrical member secured to the exhaust pipe of an automobile; means for releasably securing said tubular member in alignment with said cylindrical member; and means for automatically releasing said securing means upon the movement of the automobile either forwardly or rearwardly, said last named means comprising a supporting strut pivotally secured to said tubular member and having an operable engagement at its upper portion with said securing means and resting pivotally at its lower end on the floor.

11. An exhaust eliminator comprising a tubular member connected to an exit; means for connecting said tubular member in alignment with the exhaust pipe of an automobile, said means including a coupling member on the exhaust pipe and an endwise releasable interfitting coupling member on said tubular member, one of said coupling members having a spring pressed element abutting the opposite coupling member whereby to urge said coupling members apart; a latch element for releasably holding said exhaust pipe and tubular member in coupled condition; and means for releasing said latch element and comprising a pivotally supported strut having a pivotally supported connection with said tubular member and an operable engagement with said element.

12. An exhaust eliminator comprising a tubular member; a flexible conduit connecting said tubular member with an exit; an oscillatory strut for supporting said tubular member; means for releasably connecting said tubular member with the exhaust pipe of an automobile, said means comprising cooperating coupling members mounted respectively on said tubular member and the exhaust pipe, one of said coupling members having a spring pressed element abutting the other coupling member and acting to urge said coupling members apart; and a latch element releasably connecting said coupling members and having an operable connection with said supporting strut for said tubular member whereby to automatically effect the release of said coupling members upon the movement of the automobile.

In testimony whereof I have signed my name to this specification.

ROSCOE SINKES.